United States Patent
Revis

(10) Patent No.: US 6,613,139 B1
(45) Date of Patent: Sep. 2, 2003

(54) CHLOROSILANE BLENDS FOR TREATING SILICA

(75) Inventor: Anthony Revis, Freeland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/199,403

(22) Filed: Jul. 18, 2002

(51) Int. Cl.[7] ............................................... C04B 14/04
(52) U.S. Cl. ...................... 106/490; 106/491; 428/405
(58) Field of Search .............................. 106/490, 491; 428/405

(56) References Cited

U.S. PATENT DOCUMENTS

| | | | |
|---|---|---|---|
| 4,072,796 A | * 2/1978 | Reinhardt et al. | 428/405 |
| 5,908,660 A | 6/1999 | Griffith et al. | 427/220 |
| 6,051,672 A | 4/2000 | Burns et al. | 528/10 |
| 6,384,125 B1 | 5/2002 | Bergstrom et al. | 524/492 |

FOREIGN PATENT DOCUMENTS

| | | | |
|---|---|---|---|
| EP | 0 236 674 B1 | 2/1994 | C08L/23/04 |
| WO | WO 01/21715 A1 | 3/2001 | C09C/1/30 |

* cited by examiner

*Primary Examiner*—C. Melissa Koslow
*Assistant Examiner*—Shalie Manlove
(74) *Attorney, Agent, or Firm*—Jim L. DeCesare

(57) ABSTRACT

Modified silica fillers are prepared by contacting silica with blends or mixtures containing diorganodihalosilanes and monoorganotrihalosilanes in weight ratios of 1:0.1 to 1:2, respectively. While dialkyldichlorosilanes and monoalkyltrichlorosilane such as dimethyldichlorosilane and methyltrichlorosilane, respectively, are most preferred, the blends or mixtures may also comprise compositions containing n-propyltrichlorosilane, phenyltrichlorosilane, cyanopropyltrichlorosilane, and mercaptopropyltriethoxysilane.

8 Claims, No Drawings

CHLOROSILANE BLENDS FOR TREATING SILICA

FIELD OF THE INVENTION

This invention is related to a method of making a modified silica filler in which silica is contacted with a blend or mixture of a diorganodihalosilane and a monoorganotrihalosilane in a weight ratio of 1:0.1 to 1:2, respectively.

BACKGROUND OF THE INVENTION

This is an improvement in methods of modifying silica fillers, as described in for example, U.S. Pat. No. 6,384,125 (May 7, 2002), which is assigned to the same assignee as the present invention. While the '125 patent refers generally to the use of some similar organometallic compounds and mixtures thereof as the present invention, and their use as hydrophobing agents for silica, it does not describe any particular mixture or blend of chlorosilane compounds as being any more effective than any other blend, nor does the '125 patent identify the existence of any particular ratio of silane compounds as being necessary to achieve a new and unexpected results, i.e., an ability to deposit more siloxane on silica, vis a viz, improved hydrophobicity.

SUMMARY OF THE INVENTION

The invention is directed to a method of making modified silica fillers in which silica is contacted with a blend or mixture of organosilicon compounds. In particular, it is directed to an improvement in treating silica with blends or mixtures of diorganodihalosilanes and monoorganotrihalosilanes, in weight ratios of 1:0.1 to 1:2, respectively.

Preferably, the weight ratio is 1:0.3 to 1:1, and most preferably the weight ratio is 1:0.5. Similarly, the blend or mixture is preferably a dialkyldichlorosilane and a monoalkyltrichlorosilane, and most preferably dimethyldichlorosilane and methyltrichlorosilane. In some additional embodiments, the blend or mixture may also comprise compositions containing (i) dimethyldichlorosilane, (ii) n-propyltrichlorosilane, phenyltrichlorosilane, or cyanopropyltrichlorosilane, and (iii) mercaptopropyltriethoxysilane.

These and other features of the invention will become apparent from a consideration of the detailed description.

DETAILED DESCRIPTION OF THE INVENTION

The silica used to make the modified silica fillers according to this invention are the colloidal or precipitated silicas of the type used to formulate polymeric compositions such as rubber, particularly those rubber compositions used in the manufacture of vehicle tires for improving the mechanical properties of tire rubber. Such silicas are described in much detail in the '125 patent to which reference may be had, and which is considered as being incorporated herein by reference thereto.

Mineral fillers such as silica, having a small particle size and a large surface area, are capable of increasing the tensile strength of rubber compounds, and therefore are useful as a reinforcing material for rubber; particularly when the mineral surfaces of the filler are converted to hydrophobic low energy surfaces. Typically, this is carried out using methylchlorsilanes which react with the surface water of mineral surfaces or the water present in a reaction, i.e., hydrolysis and condensation of silanols, liberating hydrochloric acid and concurrently depositing a very thin film of methylpolysiloxanes with low critical surface tensions not wetted by water. A very simplified representation is $\equiv$Si—Cl+ $H_2O \rightarrow \equiv$SiOH+HCl$\rightarrow \equiv$Si—O—Si$\equiv$.

The silica treating agents according to the invention are blends of organodichlorosilanes and organotrichlorosilanes. The organodichlorosilanes and organotrichlorosilanes may contain alkyl groups, cycloalkyl groups, araalkyl (arylalkyl) groups, alkaryl (alkylaryl) groups, aryl groups, and certain substituted groups which are not reactive with respect to a silica surface.

Some examples of alkyl groups are methyl, ethyl, propyl, butyl, hexyl, octyl, decyl, dodecyl, octadecyl, and nonadecyl. Some examples of cycloalkyl groups are cyclobutyl and cyclohexyl. Some examples of araalkyl (arylalkyl) groups are benzyl, phenylethyl, and 2-phenylpropyl. Some examples of alkaryl (alkylaryl) groups are tolyl and mesityl. Some examples of aryl groups are phenyl, xenyl, naphthyl, and anthracyl. Some examples of substituted groups which are not reactive with respect to a silica surface are halogenated alkyl groups and aryl groups such as chloromethyl, dichloromethyl, trichloromethyl, 3-chloropropyl, chlorocyclohexyl, chlorophenyl, and dichloroxenyl; alkyl groups containing alkoxy radicals such as methoxy, ethoxy, butoxy, and pentoxy; alkyl groups containing sulfido (—S—), disulfido, or polysulfido radicals; and alkyl groups containing cyano (—C$\equiv$N) radicals.

Representative of some organodichlorosilanes and organotrichlorosilanes which can be used according to this invention are n-butylmethyldichorosilane, t-butylmethyldichorosilane, t-butylphenyldichorosilane, n-butyltrichlorosilane, t-butyltrichlorosilane, cyclohexylmethyldichorosilane, cyclohexyltrichlorosilane, cyclooctyltrichlorosilane, cyclopentyltrichlorosilane, di-n-decylmethyldichorosilane, n-decyltrichlorosilane, di-n-butyldichorosilane, di-t-butyldichorosilane, dicyclohexyldichorosilane, dicyclopentyldichorosilane, diethyldichorosilane, di-n-hexyldichorosilane, dimesityldichorosilane, dimethyldichorosilane, di-n-octyldichorosilane, di-phenyldichorosilane, di-(p-tolyl) dichorosilane, docosylmethyldichorosilane, docosyltrichlorosilane, dodecylmethyldichorosilane, dodecyltrichlorosilane, eicosyltrchlorosilane, ethylmethyldichorosilane, ethyltrichlorosilane, n-heptylmethyldichorosilane, n-heptyltrichlorosilane, n-hexadecyltrichlorosilane, hexylmethyldichorosilane, hexyltrichlorosilane, isobutyltrichlorosilane, isooctyltrichlorosilane, methyltrichlorosilane, n-octadecyltrichlorosilane, n-octylmethyldichorosilane, n-octyltrichlorosilane, pentyltrichlorosilane, phenylethyldichorosilane, phenylmethyldichorosilane, phenyltrichlorosilane, n-propyltrichlorosilane, p-tolylmethyldichorosilane, p-tolyltrichlorosilane, and triacontyltrichlorosilane.

A general method of making modified silica fillers according to the invention is described below in Example A, although the modified silica fillers can be made by any known and accepted technique, for example, as described in detail in the '125 patent, in U.S. Pat. No. 5,908,660 (Jun. 1, 1999), and in U.S. Pat. No. 6,051,672 (Apr. 18, 2000). While these patents describe general methods, they fail to describe the features of this invention, i.e., the use of a particular mixture or blend of chlorosilane compounds in a particular ratio.

When used in rubber compositions for manufacturing vehicle tires, other conventional additives may be used along with the modified silica filler, including other fillers such as carbon black, various oils, plasticizers, accelerators, antioxidants, heat stabilizers, light stabilizers, zone stabilizers, extenders, and coloring pigments.

EXAMPLES

The following examples are set forth in order to illustrate the invention in more detail. The silica slurry used in the examples contained 6.5 percent by weight of silica, and is a commercial product of PPG Industries, Inc., Pittsburgh, Pa. Neutralization was carried out by using a standard solution containing 25 percent by weight of sodium hydroxide, and it was prepared by dissolving 1000 grams of sodium hydroxide pellets in 3000 milliliter of deionized water.

The apparatus used in treating the silica consisted of a 5-liter round-bottom reaction flask, with ball joints, a Teflon® shaft stirring paddle assembly, an overhead electrical stirring motor, and a Type-K thermocouple temperature controller with a flexible heating mantle. The reaction flask was surmounted with a Dean-Stark trap and water cooler condenser with a port for a sealed glass thermocouple well directly submersed into the reaction flask. The third neck of the reaction flask was sealed with a ball-joint cap or an addition funnel. Filtration and washing of treated silica fillers and silica filler cakes was conducted with a 253 mm Coors Porcelain Buchner funnel containing Whatman filter paper. The funnel was mounted on a 4-liter filter flask. A Fisher brand Digital Conductivity Meter was used to measure the conductivity of the filtrate from the washing process. A Mettler Toledo Portable pH/on Meter, Model No. MP125 was used to measure pH.

The following procedure, used in Example 5, represents the general procedure which was repeated in the other Examples 1–4 and 6–10. Data for each of the Examples 1–10 is shown in Table 1.

Example A—A General Procedure for Examples 1–10

The reaction flask was charged with 2000 g of silica slurry and 165 g of concentrated sulphuric acid. The slurry was heated to a temperature of 70° C. and the heat was then turned off. At this point, a mixture containing 9.10 g of methyltrichlorosilane and 16.38 g of dimethyldichlorosilane was added directly to the reaction flask via a long-stem funnel in rapid fashion over a period of about 2–7 minutes. The treated slurry was then allowed to stir as it cooled to room temperature over a 60-minute period.

To the stirred slurry was added 600 mL of a solution containing 25 percent by weight of sodium hydroxide, in order to adjust the pH in the range of 3.4 to 3.7. The neutralized slurry was transferred to the Buchner funnel and vacuum filtered to removed the aqueous phase. The filter cake was then washed repeatedly with copious amounts of water until the filtrate read less than 100 micro ohms. After allowing it to air-dry overnight, the filter cake was transferred to plastic pails with lids and spray dried as follows.

The air-dried treated silica was re-slurried in deionized water to provide a slurry containing 20–40 percent by weight of the treated silica. The slurry was mixed until all of the solids were broken up. The slurry was then pumped to a Niro Atomizer spray drier at a rate of about 20 ml/minute with an inlet temperature of 260° C. and an outlet temperature of between 120–140° C. The dried and treated silica product was collected and stored in glass jars.

An elemental analysis of the treated silica was conducted by an independent testing laboratory. The results of elemental analyses obtained for treated silica fillers prepared in Examples 1–10 are shown in Table 1.

TABLE 1

| Example | Grams MPTES | Grams DMDCS | Grams of Trichlorosilane | | | | Percent Carbon | | Percent Loss Results % Loss | Addition Rate, Minutes |
| | | | M | P | Ph | CN | Theory | Actual | | |
| --- | --- | --- | --- | --- | --- | --- | --- | --- | --- | --- |
| 1 | | 25.5 | | | | | 3.28 | 2.79 | 15 | 7 |
| 2 | | 25.5 | 9.1 | | | | 3.68 | 3.54 | 4 | 7 |
| 3 | 7 | 16.4 | 9.1 | | | | 3.47 | 3.60 | 0 | 7 |
| 4 | | 16.4 | | | | | 2.18 | 1.20 | 45 | 2 |
| 5 | | 16.4 | 9.1 | | | | 2.63 | 1.84 | 30 | 2 |
| 6 | | 25.5 | | | | | 3.28 | 1.38 | 58 | 2 |
| 7 | | 25.5 | 9.1 | | | | 3.68 | 2.48 | 33 | 2 |
| 8 | | 25.5 | | 9.1 | | | 4.40 | 3.30 | 25 | 2 |
| 9 | | 25.5 | | | 9.1 | | 5.22 | 4.22 | 19 | 2 |
| 10 | | 25.5 | | | | 9.1 | 4.60 | 3.48 | 24 | 2 |

In Table 1, the following abbreviations and acronyms are used. MPTES represents 3-mercaptopropyltriethoxysilane HS—$CH_2CH_2CH_2$—$Si(OCH_3)_3$ and DMDCS represents dimethyldichlorosilane $(CH_3)_2SiCl_2$. In the column entitled Trichlorosilanes, M is methyltrichlorosilane $CH_3SiCl_3$, P is n-propyltrichlorosilane $C_3H_7SiCl_3$, Ph is phenyltrichlorosilane $C_6H_5SiCl_3$, and CN is 3-cycanopropyltrichlorosilane N≡C—$CH_2CH_2CH_2$—$SiCl_3$.

The new and unexpected results obtained according to the invention, i.e., the deposit of more siloxane, can be appreciated by comparing Examples 1 and 2, which show that the Percent Loss was decreased from 15 percent in Example 1 where only the dichlorosilane was used, to 4 percent in Example 2 where a blend of the dichlorosilane and a trichlorosilane were employed. As can be seen in Example 3, further improvements can be obtained by the addition of other silanes to the blend. Examples 4–7 show that the rate of addition is not a critical factor in improving the deposit of siloxanes on silica surfaces. Examples 8–10 show the results obtained when trichlorosilanes containing groups other than alkyl groups are employed.

Thus, a comparison of Example 1 with Example 2 shows a clear improvement. Example 3 shows that the inclusion of other additives did not have a deleterious affect; in fact, the addition of other additives to the blend of dichlorosilanes and trichlorosilanes may actually be advantageous in many some instances. A comparison of Example 4 with Example 5 shows the affect of adding a trichlorosilane, as does a comparison of Example 6 with Example 7. Also by comparing Example 6 with Examples 7–10, one can see a range of trichlorosilanes which can be used, and the fact that the presence of organofunctional moieties on trichlorosilanes did not affect performance to any great extent.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. In a method of making modified silica fillers in which silica is contacted with organosilicon compounds, the improvement comprising treating silica with a blend or mixture of a diorganodihalosilane and a monoorganotrihalosilane in a weight ratio of 1:0.1 to 1:2, respectively, the blend or mixture further comprising (iii) mercaptopropyltriethoxysilane.

2. A method according to claim 1 in which the weight ratio is 1:0.3 to 1:1.

3. A method according to claim 2 in which the weight ratio is 1:0.5.

4. A method according to claim 1 in which the blend or mixture comprises a dialkyldichlorosilane and a monoalkyltrichlorosilane.

5. A method according to claim 1 in which the blend or mixture comprises dimethyldichlorosilane and methyltrichlorosilane.

6. A method according to claim 1 in which the blend or mixture comprises (i) dimethyldichlorosilane and (ii) n-propyltrichlorosilane, phenyltrichlorosilane, or cyanopropyltrichlorosilane.

7. In a method of making modified silica fillers in which silica is contacted with organosilicon compounds, the improvement comprising treating silica with a blend or mixture of a diorganodihalosilane and a monoorganotrihalosilane in a weight ratio of 1:0.1 to 1:2, respectively, the blend or mixture further comprising (iii) an alkoxysilane.

8. A method according to claim 7 in which the alkoxysilane is mercaptopropyltriethoxysilane.

* * * * *